Dec. 6, 1966    C. PERATONER ETAL    3,289,872
ORDER PICKING AND STACKING TRUCK
Filed April 20, 1964    5 Sheets-Sheet 3

Inventors:
Lornts B. Nilsen,
Carlo Peratoner,
by Russell, Chittick & Pfund    Attorneys Dec. 6, 1966    C. PERATONER ETAL    3,289,872
ORDER PICKING AND STACKING TRUCK
Filed April 20, 1964    5 Sheets-Sheet 4
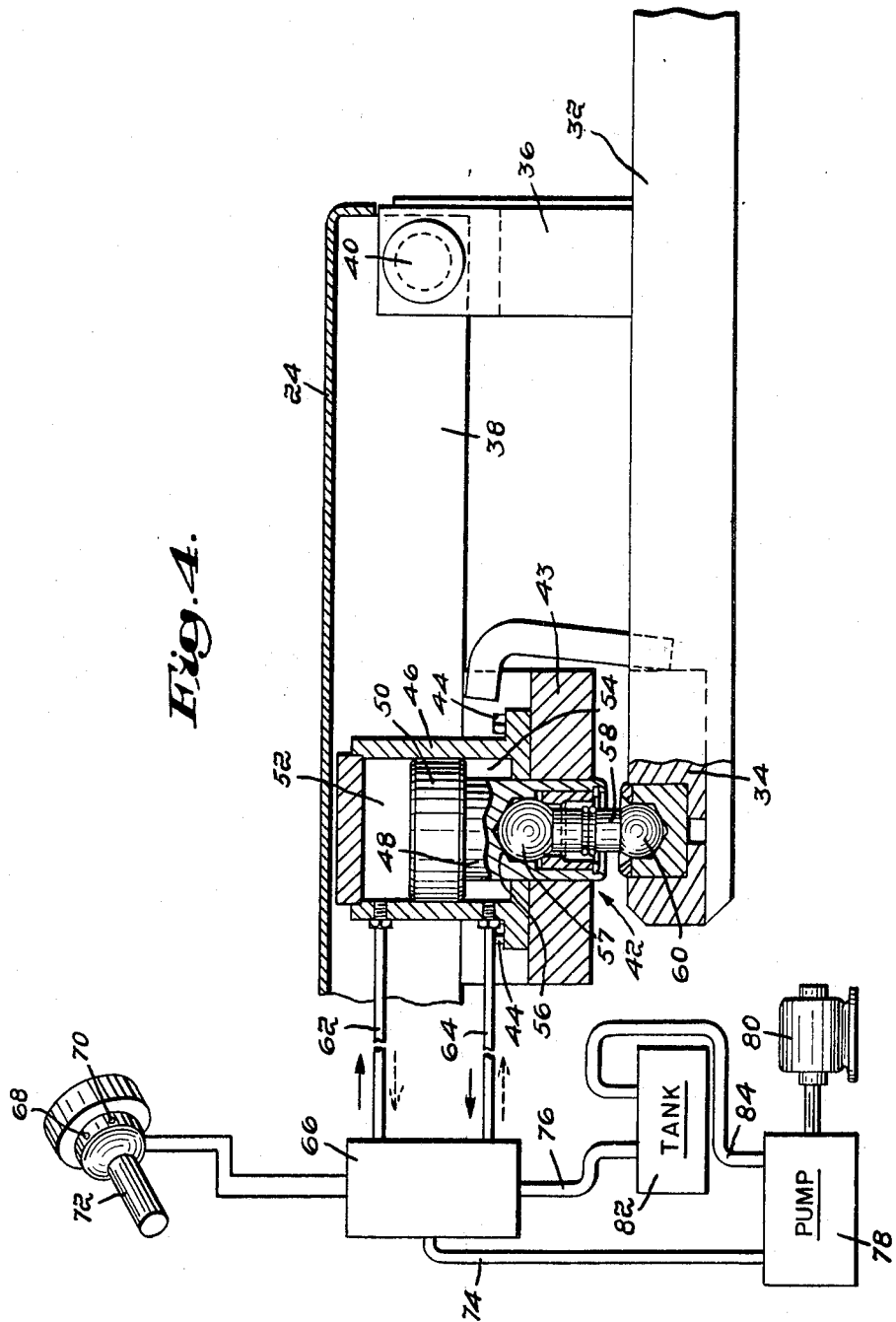
Inventors:
Lornts B. Nilsen,
Carlo Peratoner,
by Russell, Chittick & Pfund    Attorneys

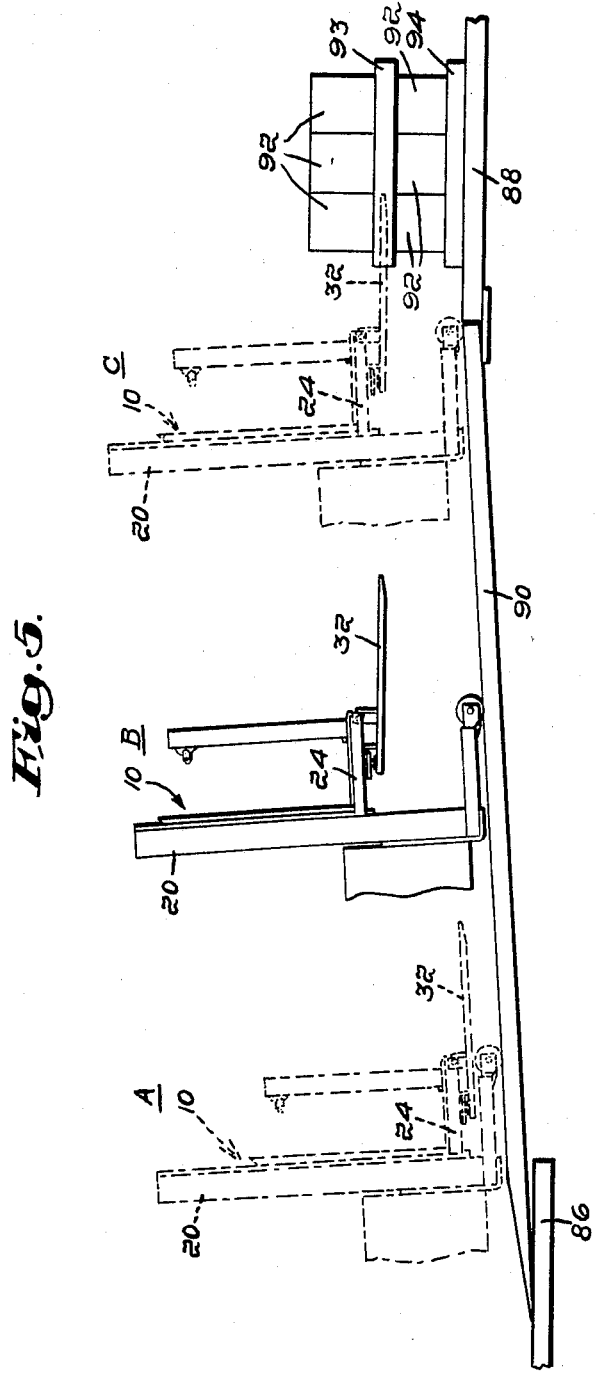

United States Patent Office 3,289,872
Patented Dec. 6, 1966

3,289,872
ORDER PICKING AND STACKING TRUCK
Carlo Peratoner, Watertown, and Lornts B. Nilsen, West Gloucester, Mass., assignors to Lewis-Shepard Company, Watertown, Mass., a corporation of Massachusetts
Filed Apr. 20, 1964, Ser. No. 361,116
3 Claims. (Cl. 214—701)

This invention relates to material handling apparatus and more particularly to a dual purpose fork truck designed for both order picking and stacking.

At present, conventional fork trucks are available wherein the operator remains in close proximity to the floor in either a stand-ride, sit-ride or walking position. In trucks of this general design, the load fork is vertically movable on an upwardly disposed mast assembly which may be tilted to the front or rear in order to impart a corresponding tilting action to the fork. By so doing, insertion of the fork beneath a pallet is greatly facilitated, particularly in situations where the truck chassis is positioned on a sloping surface. These trucks may be classified as "stacking" trucks and are utilized to lift and carry articles from the floor level to high level stored positions on racks or shelves.

Other types of conventional material handling trucks, hereinafter referred to as "order picking trucks," are provided with platforms movable vertically on upwardly disposed masts. An operator stands on the platform which is then elevated to the desired height of the shelf or rack in order to facilitate manual removal of articles stored thereon. In this type of apparatus, the mast assembly is prevented from tilting in order to avoid imparting a feeling of instability to the operator standing on the platform.

Conventional stacking trucks are sometimes modified by mounting removable remote control platforms on the load fork. In this case, the operator may perform order picking functions by elevating the fork without tilting the mast assembly. However, when the truck is needed for stacking, the platform must be removed in order to permit titling of the mast assembly.

Another object of the present invention is to provide an improved material handling truck designed specifically to perform both the stacking and order picking functions. More particularly, it has been found that by providing an operating platform vertically movable on the mast assembly with a tilting loading fork outwardly disposed therefrom, the truck may be utilized either for order picking or for stacking.

Another object of the present invention is to provide a means of tilting the load fork without disturbing the horizontally disposed operating platform. This has been accomplished by pivotally mounting the load fork on the operating platform for tilting movement above and below the horizontal.

A further object of the present invention is to provide an improved means for controlling the tilting action of the load fork from a position closely adjacent thereto, regardless of the vertical position of the load fork with respect to the truck chassis.

Another object of the present invention is to provide a combination order picking and stacking truck having a non-tilting vertical mast assembly with an order picking platform movable vertically thereon, said platform further provided with a pivotally mounted tilting loading fork extended outwardly therefrom.

A further object of the present invention is to provide pivotal means for tilting the load fork, said pivotal means controlled by an operator positioned on a platform vertically movable on the mast assembly.

These and other objects of the present invention will become more apparent as the description proceeds with the aid of the accompanying drawings in which:

FIG. 4 is an enlarged fragmentary view in elevation, partly diagrammatic of the hydraulic pivotal means operatively connected to the rear end of the tilting load fork;

FIG. 5 is a diagrammatic illustration showing a fork truck embodying the present invention being utilized on an inclined dockboard.

Figure 1:
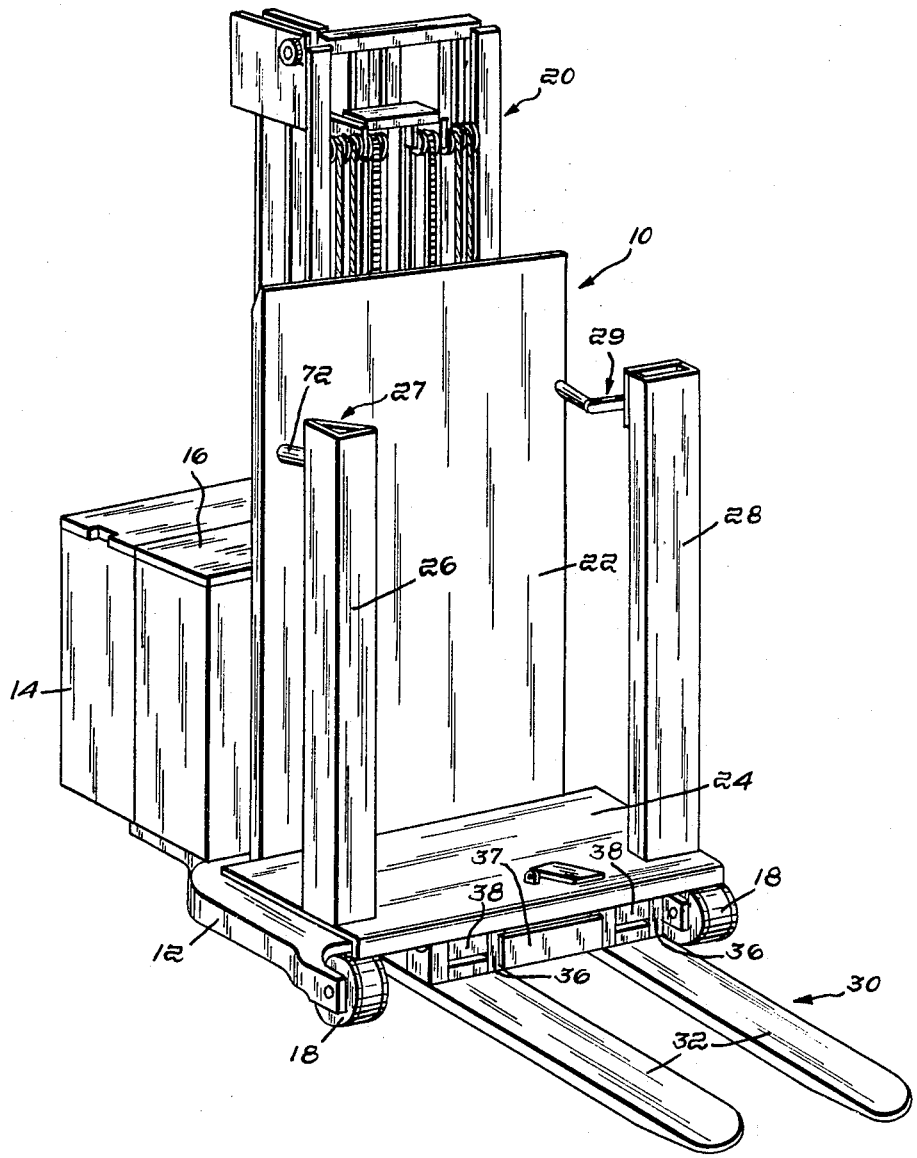
FIG. 1 is a view in perspective of a fork truck embodying the present invention.

Referring initially to FIG. 1 wherein are best shown the general features of the present invention, a fork truck generally indicated by the reference numeral 10 is shown comprising a mobile truck chassis 12 having mounted on its rear end housing 14 containing various electrical and hydraulic power components. In addition, a removable electric storage battery 16 is positioned on chassis 12 adjacent housing 14 to provide a source of power for the aforementioned components.

Mobile chassis 12 is of a generally bifurcated construction having load wheels 18 rotatably mounted at its forward end and a single steerable driven wheel (not shown) positioned beneath housing 14 at the rear end of the truck. A vertical mast assembly generally indicated by the reference numeral 20 extends upwardly from base 12 with a panel member 22 mounted for vertical movement thereon. As herein shown, the mast assembly is of the vertically extensible type providing the fork truck with a high lift capacity. It should, however, be understood that the present invention is not limited to use with trucks having extensible masts and may be utilized in connection with non-extensible mast assemblies as well.

An order picking platform 24 extends horizontally from the lower edge of panel member 22 to provide a supporting surface on which an operator may stand during operation of the truck. Vertical posts 26 and 28 extend upwardly from platform 24 to support the various truck controls 27 and 29 at their upper ends. As herein shown, reference numeral 29 relates to an operating crank which is connected by a system of cables and pulleys to the previously mentioned stearable driven wheel located beneath housing 14. By turning crank 29, an operator can perform the steering operation while facing towards the front of the truck. Reference numeral 27 refers to the control assembly which permits the operator to govern forward and rearward motion of the truck, vertical displacement of order picking platform 24, and as will hereinafter be described, the tilting action of the load fork. With this construction, an operator may stand on platform 24 facing towards the front of the truck and control the operation thereof in a convenient manner. The aforementioned construction, with the exception of any reference to the tilting fork, is essentially basic to conventional order picking trucks presently available where the operator is positioned on a vertically movable platform and is not considered inventive of itself. However, the following description of the present invention will at various times refer to these basic components.

Figure 3:
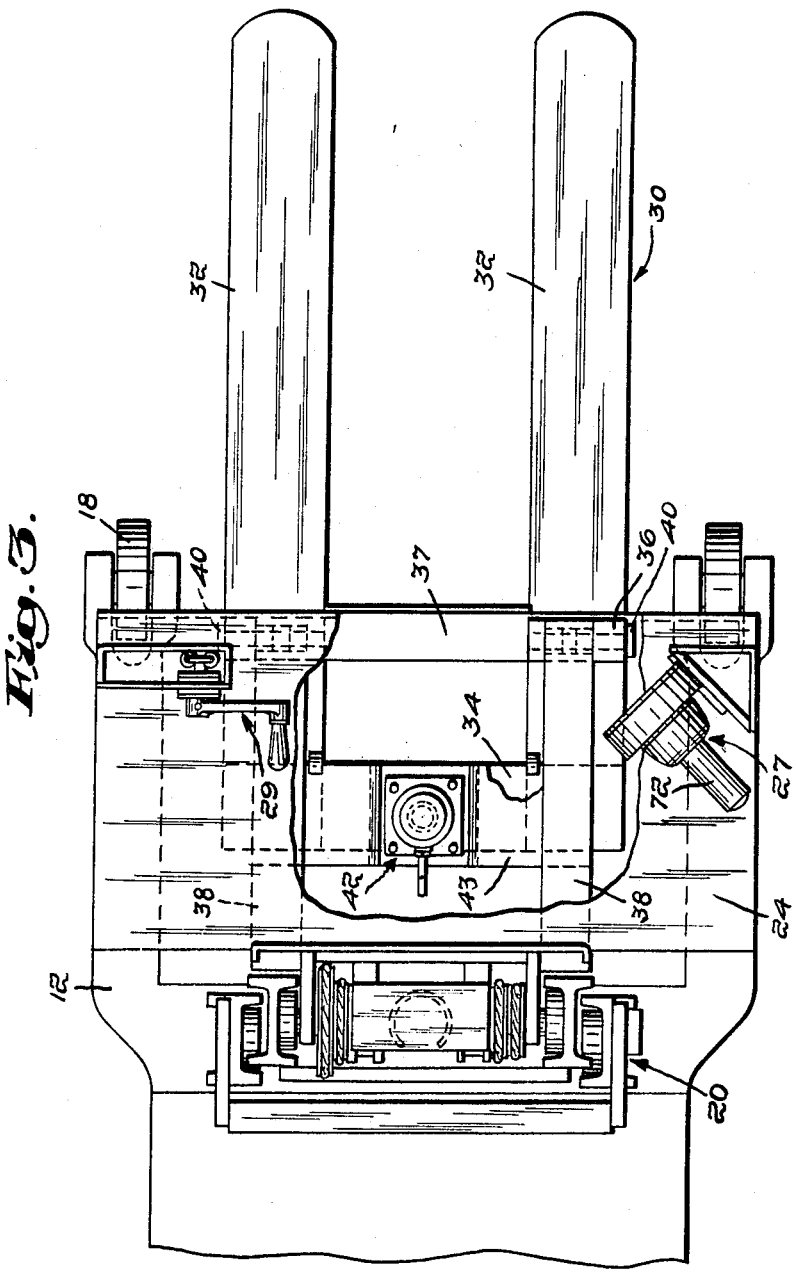
FIG. 3 is a plan view of FIG. 2 with a portion of the order picking platform broken away to show the means for pivoting the load fork.

As can be further seen from the drawings, a load fork generally indicated by the reference number 30 is comprised of substantially parallel outwardly extending arms 32 having their rear ends interconnected by means of an intermediate bracing member 34 (see FIG. 3). The arms 32 extend outwardly to the front of truck 10 from beneath order picking platform 24. Each arm 32 is provided at an intermediate point along its length with an upstanding bifurcated bracket 36, the brackets being interconnected by a second transverse bracing member 37. The brackets are designed to straddle spaced longitudinal strengthening members 38 at a point adjacent the forward edge thereof. Pins 40 extend through both the brackets 36 and members 38 to provide lateral axially aligned pivotal connections between the load fork 30 and order picking platform 24.

Figure 2:
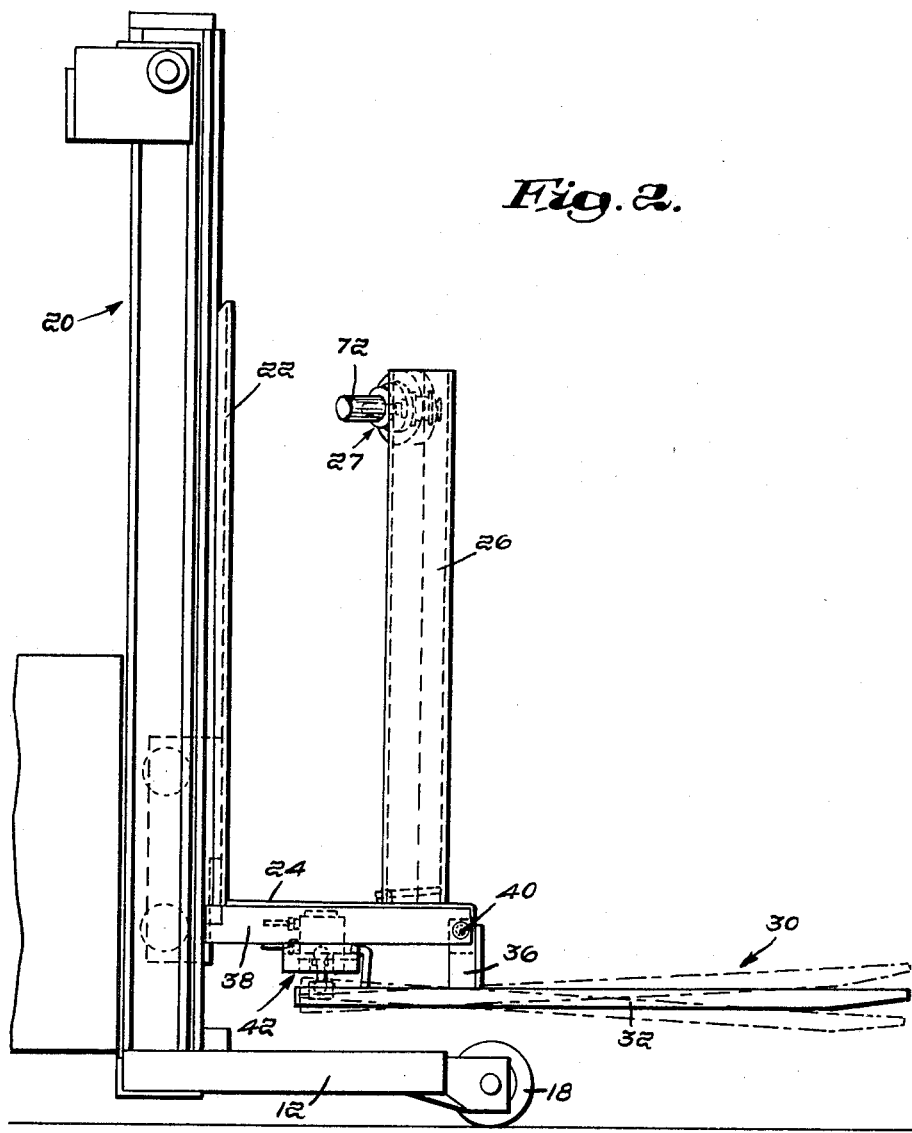
FIG. 2 is a view in side elevation of the forward portion of the fork truck illustrated in FIG. 1.

The means for tilting load fork 30 about pivot pins 40 will now be described with particular reference to FIG. 4. A double acting hydraulic cylinder assembly generally indicated by the reference numeral 42 (see FIGS. 2, 3 and 4) is shown mounted on bracket member 43 depending from beneath order picking platform 24 by means of bolts indicated typically at 44. Cylinder assembly 42 is comprised basically of a relatively short length cylinder 46 having a piston member 48 slidably contained therein. The piston, which is provided with an enlarged diameter portion 50 separating the cylinder into upper and lower chambers 52 and 54, terminates at its lower exposed end in a socket 56 pivotally containing the upper spherical head 57 of a short connecting rod 58. The lower end of rod 58 terminates in a similar spherical head 60 pivotally contained within a second socket in the transverse bracing member 34 which extends between the rear ends of fork arms 32.

Upper and lower cylinder chambers 52 and 54 on either side of enlarged piston portion 50 are connected respectively by means of flexible hoses 62 and 64 to solenoid valve 66 operated by means of push buttons 68 and 70 positioned adjacent operating handle 72 as part of truck control 27. As previously indicated, truck control 27 is positioned on the upper end of post 26 for convenient use by an operator positioned on order picking platform 24 and facing towards the front of the truck.

Feed and return lines 74 and 76 connect solenoid control valve 66 to a hydraulic pump 78 and a hydraulic fluid tank 82, the pump being driven by a conventional electric motor 80. It should be understood that pump 78, motor 80 and tank 82 are all contained within housing 14 on the rear end of the truck.

In operation, the above-described fork tilting mechanism performs as follows: by operating hydraulic pump 78, hydraulic fluid is drawn from tank 82 through suction line 84 and pumped through feed linne 74 to solenoid valve 66. When neither button 68 or 70 is depressed by an operator grasping operating handle 72, flow in either hose 62 or 64 is prevented, thereby resulting in the load fork 32 being maintained in a stationary position. When it is desired to tilt the fork upwardly about pivot pins 40, button 68 is depressed by the operator, thereby causing hydraulic fluid under pressure from pump 78 to enter through upper hose 62 into cylinder chamber 52 while simultaneously permitting fluid to escape from lower cylinder chamber 54 back through hose 64, solenoid valve 66 and return line 76 to hydraulic tank 82. This flow indicated diagrammatically in FIG. 4 by the solid arrows, drives piston 48 downwardly within cylinder 46. This downward force is transmitted through connecting rod 58 to the rear portion of fork 30 and thereby results in the forward portion of the fork being tilted upwardly about the aligned axes of pivot pins 40. It should be noted at this point that as fork 30 pivots about pins 40, the geometric center of lower spherical head 60 will swing in a circular arc while the ram assembly 42 remains stationary. This relative motion is compensated for by the dual pivotal action of spherical heads 57 and 60 at either end of connecting rod 58.

When it is desired to lower the end of load fork 32, the above-described operating cycle is simply reversed. More particularly, button 68 is released and button 70 depressed. This produces a reverse flow in flexible hoses 62 and 64 indicated diagrammatically in FIG. 4 by the dotted arrows adjacent each hose. By so doing, piston 48 is pushed upwardly into cylinder 46 as hydraulic fluid is forced into cylinder chamber 54 while simultaneously being allowed to escape from cylinder chamber 52. This in turn results in the rear end of fork 32 being pulled upwardly as its forward end is depressed.

It is important to note at this point that the aforementioned tilting action imparted to load fork 30 is achieved without affecting the relative positions of either order picking platform 24 or mast assembly 20. This is advantageous in that the operator is not disturbed by platform instability, which would be the case if the platform and fork were tipped by inclining mast assembly 20. Considerable importance is attached to this feature, particularly at times when the platform has been raised to its maximum elevation by extending mast assembly 20. At this point, the operator is usually located at a considerable distance from the floor where any distraction from his concentrated attention on operation of the truck might result in a serious mishap. In addition, by allowing the mast assembly 20 to remain vertically fixed during tilting of the forks, the construction of the truck is to a considerable extent simplified with a resulting savings in overall costs. This is particularly true in the present arrangement where the fork is tilted above or below the horizontal through the operation of a single hydraulic ram 42.

Having thus described the principal components of the present invention, its operation through both order picking and stacking cycles will now be reviewed. When utilizing the truck for order picking from high level racks or shelves, the operator positions himself on platform 24 and controls movement of the truck chassis and order picking platform by operating controls 27 and 29. The truck is simply driven to a point adjacent the shelf or rack and the order picking platform with the operator positioned thereon elevated to the desired level. Goods are then manually removed from the shelf and placed on the platform. Thereafter, the truck may be moved to another adjacent shelf with or without vertically displacing the order picking platform on the mast assembly. Throughout this cycle of operation, buttons 68 and 70 are not operated since the load fork 30 is not utilized in order picking.

When a stacking operation is to be performed, no modification need be made to the truck. The operator remains positioned on platform 24 and operates the truck in much the same manner as previously described. After positioning load fork 30 beneath an article resting on a pallet, the fork may be tilted upwardly to compensate for deflection in the elevating system without imparting a corresponding tilting action to the platform on which the operator is standing.

Further advantages of the present invention become apparent when operating the truck on a sloping surface. More particularly, as indicated in FIG. 5, spaced platforms 86 and 88 of different levels are shown connected by an intermediate sloping ramp 90 hereinafter referred to as a "dock board." In actuality, platform 86 could represent a conventional loading platform located on the side of a warehouse with platform 88 in turn representing the tail gate of a trailer truck.

As illustrated, packaged articles indicated typically by the reference numeral 92 are shown piled adjacent the rear end of platform 88 with conventional pallets 93 and 94 interposed between each layer. For purposes of illustration, only the forward portion of truck 10 has been illustrated in diagrammatic form at various stages in its travel as it is driven up dock board 90 towards the articles to be picked up.

At position A, the truck has just been driven onto dock board 90. At this point, platform 24 is at its lowest position on mast assembly 20 with the load fork 32 extending outwardly therefrom in a plane substantially parallel to the platform surface.

At point B, the operator has raised platform 24 on mast assembly 20 to an intermediate level approximating that of pallet 93. In addition, the load fork has been lowered by depressing button 70 (see FIG. 4) in order to place the load fork in a horizontal plane substantially aligned with that of upper pallet 93. Once this has been accomplished, the operator need only adjust the vertical position of platform 24 on mast assembly 20 as the truck continues to approach pallet 93. Since the slope of dock board 90 remains constant, the load fork will remain in a substantially horizontal plane, a factor greatly facilitating its insertion into the pallet. At position C the load fork 32 is shown inserted approximately halfway into pallet 93. As soon as the truck has been advanced sufficiently to fully insert the load fork within the pallet, the operator then raises platform 22 slightly to lift pallet 93 from the underlying articles and thereafter tilts load fork 32 upwardly, thus insuring proper location of the pallet thereon. Once this has been accomplished, the truck is simply backed down the dock board and driven to an alternate location.

It is our intention to cover all changes and modifications of the invention herein chosen for purposes of disclosure which do not depart from the spirit and scope of the invention.

We claim:

1. A combination order picking and stacking truck comprising a mobile base, a mast assembly extending upwardly from said base at a fixed angle thereto, a substantially horizontal platform movable vertically on said mast assembly, a tilting fork attached at an intermediate pivot point to the underside of said platform, the back portion of said fork to the rear of said intermediate pivot point positioned beneath said platform with the remaining front portion of said fork forward of said intermediate pivot point extending outwardly from said platform, pivotal means operatively connected intermediate the undersurface of said platform and the back portion of said fork, said pivotal means operative to pivot said fork about said intermediate pivot point in order to cause tilting of said front portion in relation to said platform, and control means mounted on said operating platform for controlling the vertical movement thereof as well as the movement of said mobile base and the pivotal displacement of said fork.

2. The apparatus as set forth in claim 1 wherein said pivotal means is comprised of a double acting hydraulic cylinder, said cylinder connected to a source of pressurized hydraulic fluid on said mobile base by means of flexible hoses, and valve means positioned on said platform and connected between said source of pressurized hydraulic fluid and said cylinder for controlling the operation thereof.

3. Material handling apparatus comprising the combination of: a mobile truck base, a mast assembly extending upwardly from said truck base at a fixed angle thereto, a substantially horizontal platform movable vertically on said mast assembly, a tilting load fork attached at an intermediate pivot point to the underside of said platform, the back portion of said fork to the rear of said intermediate pivot point positioned beneath said platform with the remaining front portion of said fork forward of said intermediate pivot point extending outwardly from said platform, pivotal means operatively connected intermediate the underside of said platform and the back portion of said load fork, said pivotal means comprising a double acting hydraulic cylinder connected to a source of pressurized hydraulic fluid positioned on said mobile truck base, and control means positioned on said platform for controlling the operation of said hydraulic cylinder in order to pivot said fork about said intermediate pivot point, thereby causing the front portion of said load fork to tilt through a predetermined angular range with respect to said platform.

References Cited by the Examiner

UNITED STATES PATENTS

| | | | |
|---|---|---|---|
| 1,563,650 | 12/1925 | Pleines | 214—700 |
| 2,598,865 | 6/1952 | Turner | 214—731 |
| 2,658,638 | 11/1953 | Sartin | 214—750 |
| 2,738,087 | 3/1956 | Arnot | 214—701 |
| 2,975,923 | 3/1961 | Vlinski | 214—730 |

GERALD M. FORLENZA, *Primary Examiner.*

R. B. JOHNSON, *Assistant Examiner.*